B. G. FITZHUGH.
Dumping Carts.

No. 138,013.  Patented April 22, 1873.

Witnesses:
J. West Wagner
Aug. H. Girard.

Inventor:
Benjamin G. Fitzhugh
By Johnson Klauck &c
his Attorneys.

UNITED STATES PATENT OFFICE.

BENJAMIN G. FITZHUGH, OF FREDERICK, ASSIGNOR TO MATHIAS MARTIN, OF BALTIMORE, MARYLAND.

IMPROVEMENT IN DUMPING-CARTS.

Specification forming part of Letters Patent No. 138,013, dated April 22, 1873; application filed August 23, 1872.

*To all whom it may concern:*

Be it known that I, BENJAMIN G. FITZHUGH, of the city and county of Frederick, in the State of Maryland, have invented certain new and useful Improvements in Self-Dumping Carts, of which the following is a specification:

My invention relates to dumping-carts; and the improvement which forms the subject-matter of this patent consists of a weighted lever, having its fulcrum in the body of the cart, and operating-arms to automatically lock with the shafts to hold the body up, the said automatic action of the weighted lever being produced by its rearward extension from its fulcrum, in a manner to constantly tend to force the lower ends of the arms frontward into the interlocking holding-catches; also, in combining, with the weighted lever having arms and a pivot-connection with the cart-body, a cord by which the lever is operated to both dump the cart and bring it again in position for being locked to the shafts; also, of a cart having its supporting-wheels and the rear end of its body made in such relation to each other, the axle-tree, and the hinges of the shafts that, when dumped, the rear upper edge of the body will strike the ground and arrest the body so as to dump the load, thus making a new dumping-cart with a fixed tail-board, very useful for general hauling purposes.

Figure 1:
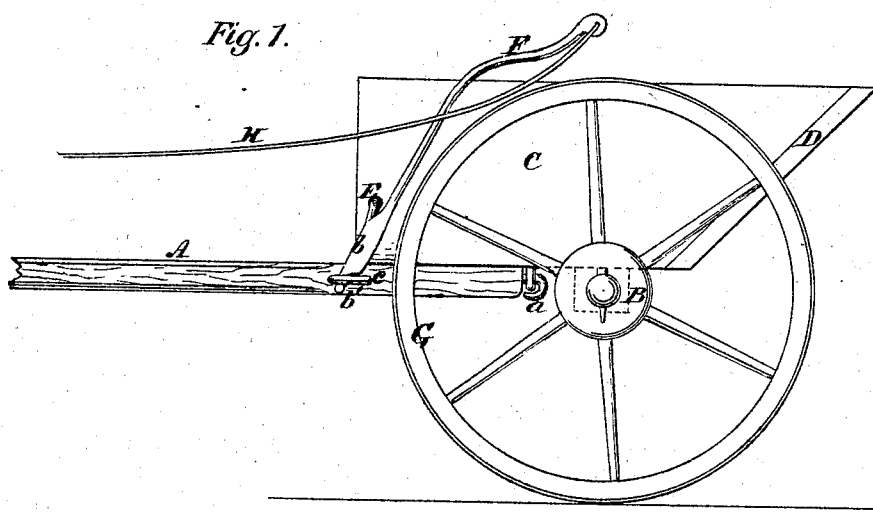
Figure 2:
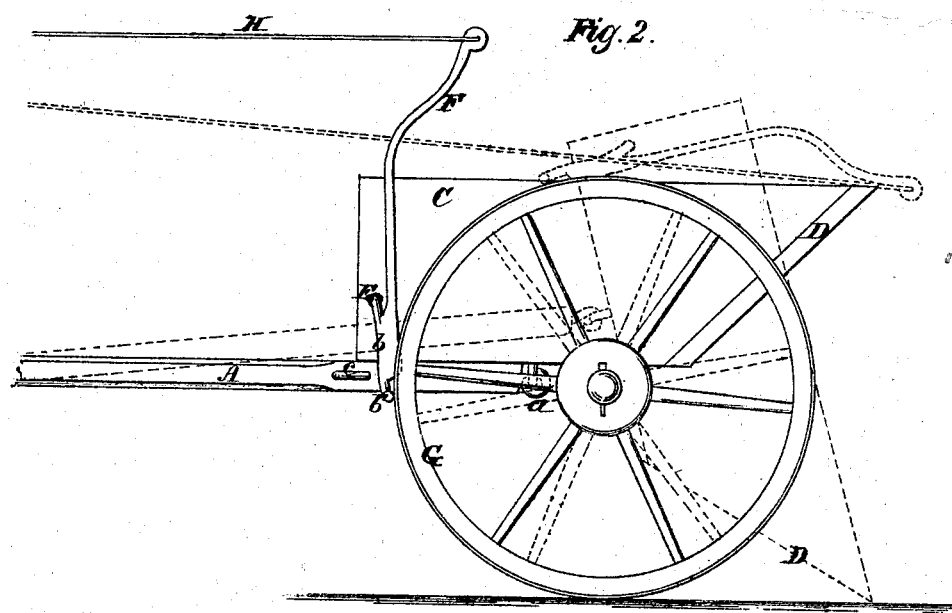

In the accompanying drawing, Figure 1 represents a side elevation of a dumping-cart embracing my improvements, the body being shown as locked. Fig. 2 represents a similar view, the body being shown as clamped to the wheels, and the dotted lines in said figure showing the cart as dumped by the backing thereof.

The shafts A of the cart are hinged to the body thereof at *a*, in front of the axle B, so as to allow the body C, when unlocked from the shafts, to tilt readily to dump the load. The tail-board D, or rear end of the body C, is arranged at an angle flaring outward from the bottom, the object of which is the more readily to accomplish the dumping of the load, and to dispense with the necessity of having to remove the tail-board for that purpose, although a removable tail-board may be used. The advantages of this inclined tail-board D are quite obvious and highly important, as by it, when the cart is dumped, the top part strikes the ground, so that the body is nearly in a vertical position, and the contents thereby are completely emptied. To the body C of the cart, at the front end and at the bottom, a transverse rod, E, is arranged, having a crank end, $b$, projecting from each side downward, and arranged to interlock with a hook-arm, $c$, projecting from each side of the shafts. To one or both the cranks $b$ a weighted handle or lever, F, is secured, extending rearward from the bearings of the crank-rod E, the tendency of which, by its weight, is to constantly force the cranks $b$ forward, and thus hold their horizontal branches $b'$ safely interlocked with the hooked arms $c$ of the shafts, so that no jarring or accident can easily displace them. The horizontal branches $b'$ of the cranks $b$ serve another purpose, that of clamping the body C of the cart to the wheels G, so that by backing the cart slightly the wheel or wheels thus clamped will carry the body over and dump the load. This, of course, is after the crank-arms $b$ have been unlocked with the shaft-hooks $c$, which is accomplished simply by the driver pulling a cord, H, attached to the upper end of the weighted lever E, so that in drawing them forward the crank-arms $b$ will be forced backward, and as the branches $b'$ extend just in front of the supporting-wheels, they will, of course, be clamped against them with a force equal to that exerted to pull the weighted levers forward, and as the body of the cart is nearly balanced upon its connection with the shafts, it does not require much force to cause the wheels to carry over and dump the body. This being effected, the body C is again brought up in position upon the shafts, by pulling with the same cord H, by means of which the body was unlocked. In this way the cart is managed with little or no labor to the driver in dumping it, the operation being accomplished by simply pulling upon a cord to release the lock of the body and clamp it to the wheels, and by backing the horse a little the thing is accomplished. The load having been dumped and the cart-body brought again in position for loading, the weighted lever or levers F brings at once the crank-arms $b'$ in position to be securely locked with the hook-arms $c$ of the shaft. A spring may be used, if necessary, to constantly force each weighted lever rearward, and thus insure its locking action with the shafts at the moment the body is brought into proper position thereon.

It will be observed that the supporting-wheels, the inclination of the rear end of the body, the axle-tree, and the hinges of the shafts must be arranged and bear such relation to each other as to cause, when the body is dumped, the rear upper edge to strike the ground, arrest the body, and dump the load therefrom. The inclined end-board D for this purpose joins the straight bottom of the cart at a point very near the axle, as shown in the drawing; and the body is fixed to the axle, so that in dumping the body turns with the axle directly upon the supporting-wheels, thus forming a new dumping-cart, which for general hauling purposes has many advantages over the common cart now in use, in which the lower rear-projecting ends of the body are made to strike the ground, and the tail-board must be removed before the load can be dumped.

I am aware that inclined fixed end-boards are not new in hinged dumping-car bodies and hand-carts, and I do not claim such a thing; but my invention is designed to render the common cart different from any hitherto in use, and to obtain advantages thereby not now possessed by them.

Having described my invention, I claim—

1. The weighted automatic locking-lever F, having a fulcrum-bearing, E, in the body of the cart, and an arm or arms, $b$, which serve to lock the body with the shafts automatically and to maintain the lock, as described.

2. In combination with the lever F, arranged and connected with the body as described, the cord H, by which the body is dumped and brought up into position after being dumped, as described.

3. The cart having its supporting-wheels G, rear end D of the body C, axle-tree B, and shaft-hinges $a$, in such relation to each other that when the body is dumped its rear upper edge will strike the ground and arrest the body to dump the load, as described, and shown in the drawing.

In testimony whereof I have hereunto set my hand this 9th day of August, A. D. 1872.

B. G. FITZHUGH.

Witnesses:
A. E. H. JOHNSON,
J. W. HAMILTON JOHNSON.